H. CHRISMAN.
METER SYSTEM.
APPLICATION FILED AUG. 29, 1910.

1,120,905.

Patented Dec. 15, 1914.
2 SHEETS—SHEET 1.

WITNESSES

INVENTOR
Horace Chrisman
by Jno. P. Green
his Attorney in fact

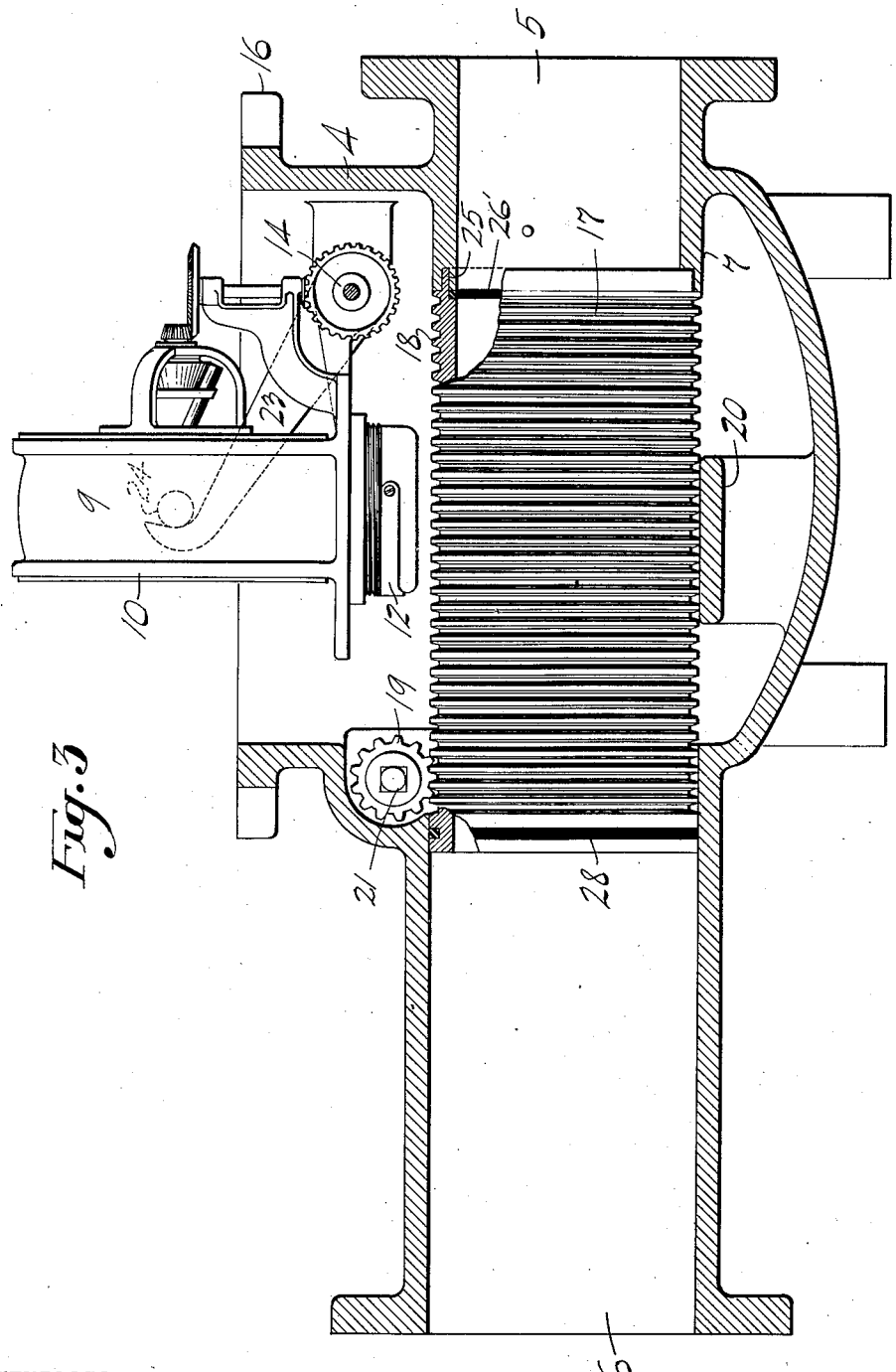

UNITED STATES PATENT OFFICE.

HORACE CHRISMAN, OF EDGEWOOD PARK, PENNSYLVANIA, ASSIGNOR TO PITTSBURG METER COMPANY, A CORPORATION OF PENNSYLVANIA.

METER SYSTEM.

1,120,905.  Specification of Letters Patent.  Patented Dec. 15, 1914.

Application filed August 29, 1910. Serial No. 579,503.

*To all whom it may concern:*

Be it known that I, HORACE CHRISMAN, a citizen of the United States, and a resident of Edgewood Park, in the county of Allegheny and State of Pennsylvania, have made a new and useful Invention in Meter Systems, of which the following is a specification.

This invention relates to water distributing systems and has for an object to produce means whereby access may be had to a portion of the system without the necessity of shutting off the supply of water to the system.

A further object is to provide a meter or a valve casing for water distributing systems, in which means are employed whereby access may be had to the meter or to the valve without the necessity of shutting off the water or in any way obstructing its flow.

These and other objects I attain in an apparatus embodying the features herein described, and illustrated in the drawings accompanying this application and forming a part thereof.

In the drawings, Figure 1 is a plan view of apparatus embodying my invention; the apparatus is shown with the top removed and portions are shown in section for convenience of illustration.

Fig. 3 is a sectional view on an enlarged scale along the line 2—2 of Fig. 1 and illustrates the positions of the parts when the cover of the casing is removed, and the interior of the casing is accessible.

Figure 1:
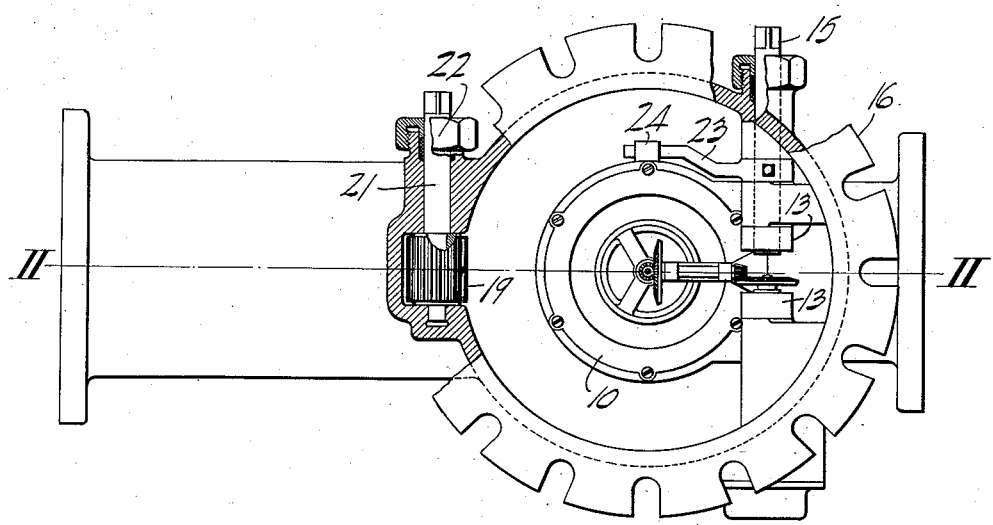

In the drawings, I have illustrated my invention in connection with the small flow meter of a detector-meter system, but with no idea of in any way limiting its scope.

In order that the invention may be fully understood, I will first briefly describe the arrangement of a detector-meter system: Detector-meters are employed in connection with water mains, which are used for ordinary distributing purposes and also for fire service. During ordinary service, it is necessary to accurately measure the amount of water delivered by the system; and since the flows are small, the most accurate results are obtained by positive recording meters; that is by meters, through which the water to be measured, passes. Such meters are objectionable, for obvious reasons, when located in mains depended upon for fire service. The meter for recording the small flow is ordinarily located in a by-pass, which extends around an emergency valve located in the main and adapted to open voluntarily during large flows; or a positive recording meter is so located and arranged in the main that it will intercept the small flows of water and cause them to pass through it, and will swing from its normal and operative position so as to provide a substantially unobstructed passage when the rate of flow is increased by an abnormal demand for water. Both arrangements are employed with a detector, which indicates in one way or other that the recording meter has been rendered inoperative.

I have illustrated my invention in connection with a meter system embodying the latter arrangement, that is, a meter which is adapted to move to an inoperative position when the flow of water through the main exceeds the normal.

The numeral 4 indicates a casing which is in effect a valve casing and which is provided with flanged inlet and outlet ports 5 and 6. The ports of the casing are adapted to communicate with the main of a water distributing system and are so arranged that the water traversing the main will pass through the casing. The inlet port 5 is provided with a reëntrant flange 7, which projects into a chamber 8 formed within the casing, and is axially alined with the flange of the port 6.

Figure 2:
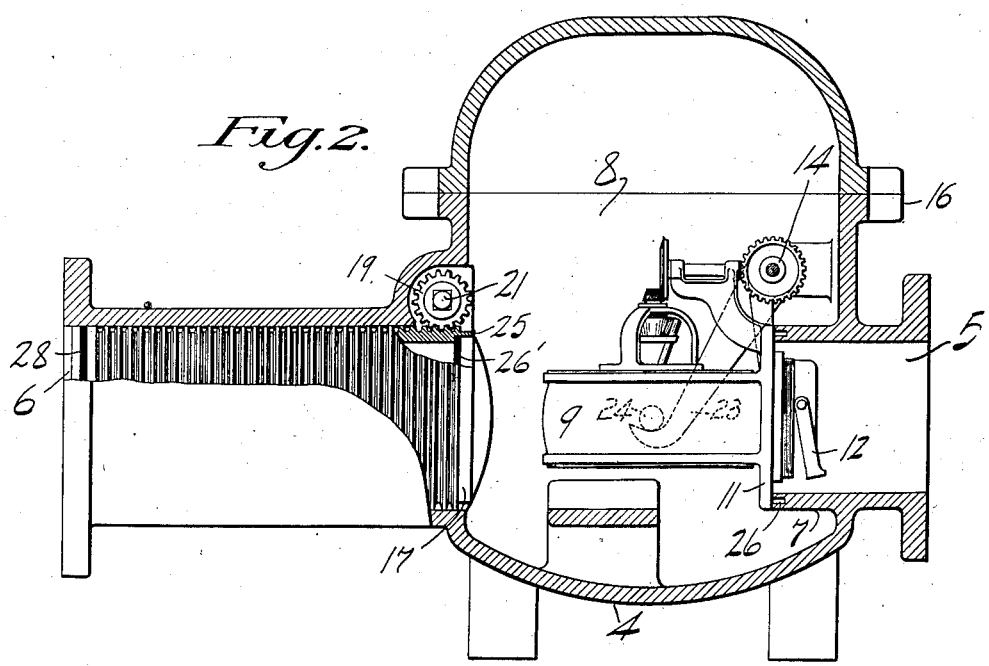
Fig. 2 is a partial sectional view along the line 2—2 of Fig. 1 and illustrates the positions of the parts under normal conditions.

A recording device or meter 9 is suspended within the chamber 8 and is so arranged that it seats on the inner edge of the flange 7, as shown in Figures 1 and 2, and intercepts the water traversing the casing during small or normal flows through the main, and swings to an inoperative position and provides a substantially unobstructed passage for the water through the casing 4, when the flow of water exceeds the normal. Any type of meter may be employed; the meter shown, however, is of the wabble-disk type and is provided with a casing 10, which incloses the disk and is provided with inlet and outlet ports. A substantially circular disk or plate 11 is illustrated as being integrally formed with the casing 10 and is so located that it seats on the inner edge of the flange 7 when the meter 9 is in the operative or normal position. A suitable opening (not shown) is provided in the disk 11, which communicates with the inlet port 5 of the casing 4, and with the inlet port of the meter. A ported cap 12 is mounted on the disk 11 and is adapted to cover and to some extent form a shield for the inlet port of the meter. The cap provides sufficient communication between the inlet port 5 and the meter to accommodate all normal flows of water. The discharge port of the meter is not shown, but it is so located that it communicates with the chamber 8. With this arrangement, the water traversing the main, during normal flows, passes through the meter and is then discharged into the chamber 8 from which it is delivered through the port 6.

Suspending lugs 13 are provided on the plate 11, and the meter is suspended by means of them on pins 14 and 15, which are mounted in suitable lugs provided on the casing 4. The meter with the plate 11 is, in effect, an emergency valve, since it covers the port 5, during normal flows and opens voluntarily to provide an unobstructed passage through the port during abnormal flows. A cover (not shown) is provided for the casing 4 and is adapted to be secured in place on a flange 16 provided on the casing. The cover is so constructed that it permits the meter to swing unimpeded.

One of the principal features of my invention is the production of means whereby the cover of the casing 4 may be removed and the meter 9 inspected, repaired or removed, without the necessity of shutting off the flow of water through the main.

In the illustrated embodiment of my invention, I provide a sleeve 17, which is normally located in the flange of the port 6 and is capable of being moved across the chamber 8 so as to form a direct means of communication between the ports 5 and 6, when the meter 9 is swung to an inoperative position. The sleeve 17 is provided with gear teeth 18, which are cut or otherwise formed on its outer surface, and which are adapted to coöperate with a pinion 19 and to perform the functions of a rack in reciprocating the sleeve. The teeth 18 are preferably annular and extend around the sleeve 17. This construction is employed merely for the purpose of insuring engagement between the teeth and the pinion 19 and of obviating the necessity of employing a guide for the sleeve to prevent it from turning. Such a guide would be necessary if a narrow rack were employed. In addition to this the friction surface between the sleeve and the flange of the port 6 is reduced by providing the gear teeth on the outer surface of the sleeve.

A guide or support 20 is located within the chamber 8 and is adapted to guide and support the sleeve in its motion across the chamber and to hold it in place after it has bridged the chamber.

The pinion 19 is located in a recess formed within the casing 4 and is mounted on a shaft 21 which extends through a suitably packed gland and bushing 22 and projects beyond the casing 4. The outer end of the shaft is arranged to receive a crank or operating handle, by means of which the pinion 19 may be turned for the purpose of moving the sleeve 17. The supporting pin 15 of the meter 9 also extends out of the casing 4, through a suitably packed gland and bushing, and is arranged to receive a crank or operating handle, which may be employed in raising the meter from an operative position, as illustrated in Figures 1 and 2, to an inoperative position, as shown in Figure 3. An arm 23 is mounted on the shaft 15 and its free end is adapted to engage a lug 24 provided on the meter casing 10 and to lift or swing the meter to the inoperative position when the shaft 15 is turned.

When it is desired to obtain access to the meter 9, the crank 15 is turned so as to swing the meter to the inoperative position, illustrated in Figure 3, the shaft 21 is then turned so as to move the sleeve 17 across the chamber 8 and into engagement with the inner end of the reëntrant flange 17. The top of the casing 4 can then be removed without the necessity of shutting off the flow of water through the casing, since the water will pass directly through the sleeve 17 instead of the chamber 8.

The outer end of the sleeve 17 is provided with an annular flange 25, which is adapted to project into an annular recess 26, formed in the end of the flange 7, when the sleeve is moved to engage the flange 7. A packing 26' is also provided on the end of the sleeve for the purpose of insuring a tight joint between it and the flange 7, and a packing 28 is located at the other end of the sleeve for preventing leakage around the sleeve and into the chamber 8. After the meter 9 has been repaired and it is desired to replace it in the operating position in the casing 4, the procedure is as follows:

The cover of the casing 4 is first secured in place, the sleeve 17 is then withdrawn from the chamber 8 into the flange of the port 6 and the meter is then swung to its normal operative position through the agency of the pin 15.

The sleeve 17, or an equivalent device, may be employed in connection with the emergency valve of detector-meter systems employing a by-pass around the valve; or it may be employed with any valve which is capable of being moved to an inoperative position.

Having now described my invention, what I claim is:

1. In combination with a casing provided with an inlet and an outlet port, a swinging device located within said casing for covering one of said ports, means exterior to said casing for moving said device to uncover the port and means located within the casing and movable from the exterior of the casing for directly connecting said ports when said device is moved to uncover the port.

2. In combination with a casing provided with an inlet and an outlet port, and a chamber communicating with said ports, a swinging device located within said chamber for covering one of said ports, means located exterior to said chamber for moving said device to uncover the port and means movable from the exterior of the casing for bridging the chamber and directly connecting said ports when said device is moved to uncover the port.

3. A device of the class described comprising in combination a main, a casing in said main having a passageway forming in effect a substantial continuation of the main, a movable member in the casing adapted to be moved into and out of said passageway, a chamber in which the movable member lies when moved into inoperative position, a detachable closure for said chamber, and means whereby said chamber may be shut off from said passageway permitting access to the chamber, said means normally occupying a position permitting the free operation of said movable member under service conditions.

4. A device of the class described comprising in combination a main, a casing in said main having a passageway forming in effect a substantial continuation of the main, a movable member in the casing adapted to be moved into and out of said passageway, a chamber in which the movable member lies when moved into inoperative position, a detachable cover for said chamber, a movable closure member whereby said chamber may be shut off from said passageway, and means for moving said closure member from the exterior, said closure member normally occupying a position permitting the free operation of said movable member under service conditions.

5. In a device of the class described the combination of a casing having an inlet and an outlet port and provided with a chamber, a movable device having operative relation with one of said ports and movable to an inoperative position in said chamber, and bridging means to connect said ports and close off communication between the casing and said chamber when said movable device has been moved to inoperative position, the said chamber having means permitting access to said movable device from the exterior, and the said bridging means normally occupying a position permitting the free operation of said movable device under service conditions.

6. The combination of a casing forming part of a main and having an inlet and an outlet port and a chamber out of the direct line of flow, a movable valvular device in the casing adapted to close one of said ports when moved to operative position and to lie in said chamber when moved to an inoperative position, and a fixture for said casing mounted for movement therein and adapted to bridge the space between said ports and close off communication with said chamber, said fixture normally occupying a position permitting the free operation of the valvular device under service conditions.

In testimony whereof, I have hereunto subscribed my name this 25th day of August, 1910.

HORACE CHRISMAN.

Witnesses:
C. W. McGhee,
E. W. McCallister.